US012806566B2

United States Patent

Sakthivel et al.

(12) United States Patent
(10) Patent No.: US 12,806,566 B2
(45) Date of Patent: Nov. 24, 2026

(54) METHOD OF PACKAGING AND DESIGNING BRAGG GRATING OPTICAL FIBER SYSTEM FOR SENSING CARBON DIOXIDE

(71) Applicant: Baker Hughes Oilfield Operations LLC, Houston, TX (US)

(72) Inventors: Navin Sakthivel, Spring, TX (US); Aaron Avagliano, Tomball, TX (US); Paul Wysocki, Blacksburg, VA (US); Juan Franco, Blacksburg, VA (US); Holger Stibbe, Humble, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 724 days.

(21) Appl. No.: 18/191,657

(22) Filed: Mar. 28, 2023

(65) Prior Publication Data

US 2023/0311060 A1 Oct. 5, 2023

Related U.S. Application Data

(60) Provisional application No. 63/326,678, filed on Apr. 1, 2022.

(51) Int. Cl.
*B01D 53/30* (2006.01)
*B01D 3/34* (2006.01)
(Continued)

(52) U.S. Cl.
CPC ............. *B01D 53/62* (2013.01); *B01D 3/346* (2013.01); *G01N 21/774* (2013.01); *B01D 53/1412* (2013.01); *B01D 2257/504* (2013.01)

(58) Field of Classification Search
CPC .... B01D 53/62; B01D 3/346; B01D 53/1412; B01D 2257/504; B01D 53/346;
(Continued)

(56) References Cited

U.S. PATENT DOCUMENTS 4,932,263 A 6/1990 Wlodarczyk
5,320,814 A * 6/1994 Walt .................. G01N 21/7703 422/82.07
(Continued)

FOREIGN PATENT DOCUMENTS

CN 1993533 B 9/2014
WO 0065389 A1 11/2000
(Continued)

OTHER PUBLICATIONS

International Search Report & Written Opinion in International Application No. PCT/US2023/016711, mailed Jul. 11, 2023; 7 pages.
(Continued)

*Primary Examiner* — Frank M Lawrence, Jr.
(74) *Attorney, Agent, or Firm* — CANTOR COLBURN LLP

(57) ABSTRACT

A system and a method of carbon capture. The system includes a volume having a gas mixture therein, an optical fiber and a processor. The gas mixture includes carbon dioxide as a component. The optical fiber has a coating sensitive to carbon dioxide to generate a strain on the optical fiber. The processor is configured to adjust an operating parameter of the system based on a presence of the carbon dioxide determined using the optical fiber.

13 Claims, 3 Drawing Sheets

(51) Int. Cl.

*B01D 53/62* (2006.01)
*C03C 25/106* (2018.01)
*G01N 21/77* (2006.01)
*B01D 53/14* (2006.01)

(58) Field of Classification Search

CPC ...... B01D 2252/204; B01D 2258/0283; G01N 21/774; G01L 1/246; Y02C 20/40
USPC .................... 95/139; 423/220, 228, 229, 230
See application file for complete search history.

(56) References Cited

U.S. PATENT DOCUMENTS

| | | | | |
|---|---|---|---|---|
| 2002/0007945 | A1 | 1/2002 | Neuroth et al. | |
| 2005/0061058 | A1 | 3/2005 | Willsch et al. | |
| 2008/0272311 | A1 | 11/2008 | Egalon | |
| 2009/0287092 | A1 | 11/2009 | Leo et al. | |
| 2012/0029835 | A1* | 2/2012 | Xia | G01N 21/0303 385/12 |
| 2016/0252450 | A1* | 9/2016 | Wild | E21B 47/10 356/481 |
| 2017/0232381 | A1* | 8/2017 | Donahue | F02M 25/12 123/41.56 |
| 2018/0252556 | A1 | 9/2018 | Kishida et al. | |
| 2023/0039427 | A1* | 2/2023 | Kim | C03C 25/47 |
| 2023/0069606 | A1* | 3/2023 | Bond | G01M 3/047 |
| 2023/0213669 | A1* | 7/2023 | Yu | G01D 5/35361 166/250.1 |
| 2023/0324238 | A1 | 10/2023 | Sakthivel et al. | |

FOREIGN PATENT DOCUMENTS

| | | | |
|---|---|---|---|
| WO | 03071215 | A1 | 8/2003 |
| WO | 2008089208 | A2 | 7/2008 |

OTHER PUBLICATIONS

International Search Report and Written Opinion, Mailed Jul. 17, 2023, Application No. PCT/US2023/016708; Filed Mar. 29, 2023, 10 pages.

* cited by examiner

METHOD OF PACKAGING AND DESIGNING BRAGG GRATING OPTICAL FIBER SYSTEM FOR SENSING CARBON DIOXIDE

CROSS-REFERENCE TO RELATED APPLICATIONS

This application claims the benefit of U.S. Provisional Patent Application No. 63/326,678 filed Apr. 1, 2022, the disclosure of which is incorporated herein by reference in its entirety.

BACKGROUND

Efforts are being made to reduce the carbon footprint generated in the petroleum industry. One method involves carbon capture utilization and storage (CCUS) in which carbon dioxide emissions from sources like coal-fired power plants are captured and either reused or stored in a manner that prevent it from entering the atmosphere. Carbon dioxide storage can include storing the carbon dioxide in geological formations that are known to have stored carbon dioxide over millions of years, such oil and gas reservoirs, etc. When implementing CCUS systems, it is useful to be able to identify carbon dioxide from a gas mixture in order to monitor the performance of the CCUS and to takes steps to improve such performance.

SUMMARY

In one aspect, a method of carbon capture is disclosed. An optical fiber is disposed in a volume of a carbon capture utilization and storage system, the optical fiber including a coating that is sensitive to carbon dioxide to generate a strain on the optical fiber. A presence of carbon dioxide in the volume is determined from the strain on the optical fiber. An operating parameter for the carbon capture utilization and storage system is adjusted based on the presence of the carbon dioxide in the volume.

In another aspect, a system for carbon capture is disclosed. The system includes a volume having a gas mixture therein, the gas mixture including carbon dioxide as a component, an optical fiber having a coating sensitive to carbon dioxide to generate a strain on the optical fiber, and a processor configured to adjust an operating parameter of the system based on a presence of the carbon dioxide determined using the optical fiber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
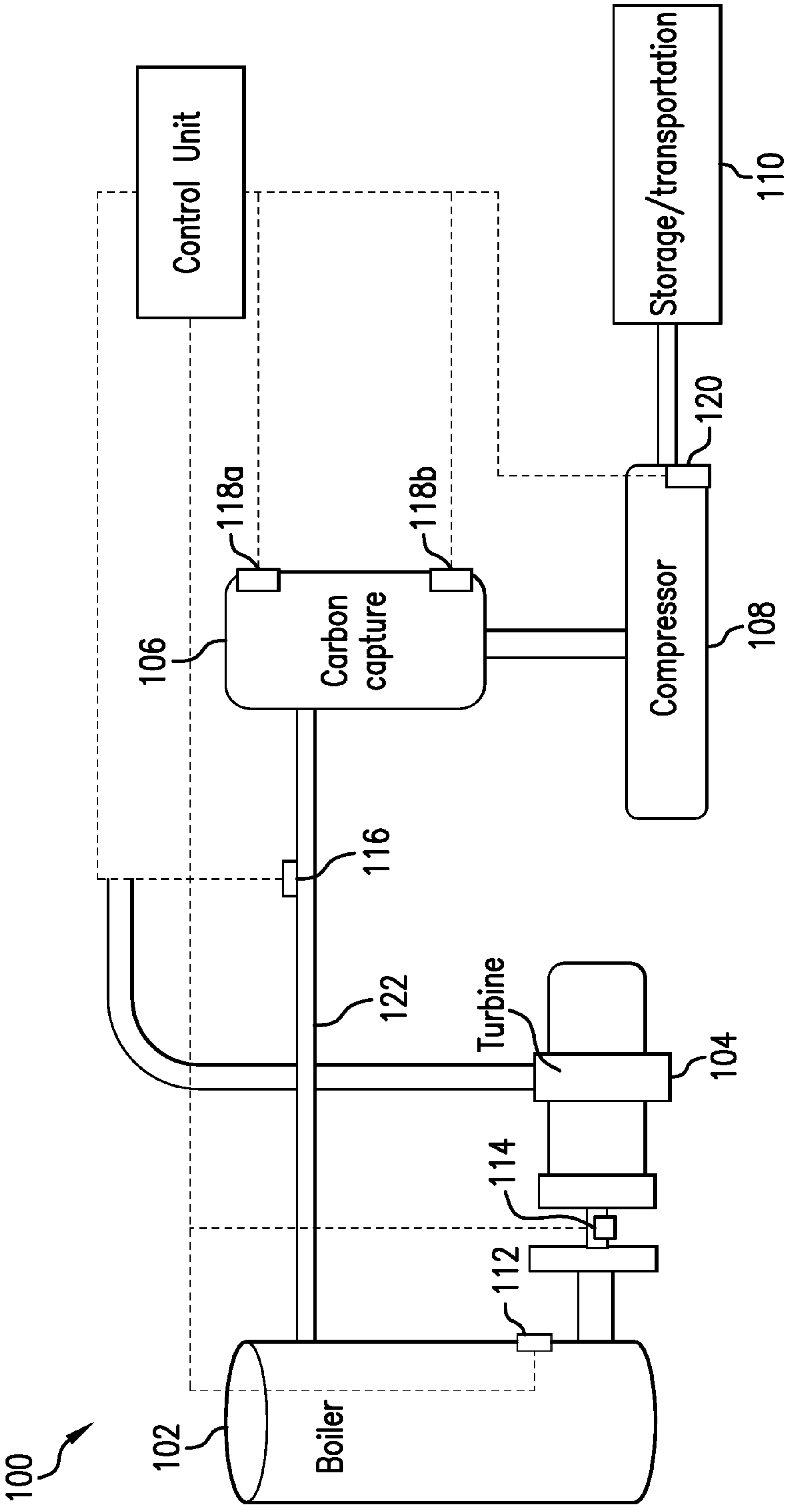
FIG. 1 shows a schematic diagram of a carbon capture utilization and storage system (CCUS), in an illustrative embodiment.

Referring to FIG. 1, a schematic diagram of a carbon capture utilization and storage system (CCUS 100) is shown in an illustrative embodiment. The CCUS 100 includes a heat exchanger or boiler 102, a turbine 104, a carbon capture device 106, a compressor 108 and a storage or transportation unit 110. The boiler 102 provides a working gas to the turbine 104, which generates energy or electricity using the working gas. As a result of generating the heat for the turbine 104, the boiler 102 also generates a flue gas that includes a mixture of CO2 and non-CO2 gases. The flue gas is sent or pumped from the boiler 102 to the carbon capture device 106 via a pipeline 122. The carbon capture device 106 separates CO2 from the flue gas into a distillate gas. In various embodiments, the carbon capture device uses a chemical that is a CO2 absorber to chemically extract the CO2 form the flue gas. The CO2 absorber can be an amine or an amine compound. Once separated, the distillate gas of CO2 is sent or pumped to the compressor 108. The compressor 108 compresses or liquifies the CO2, which is then sent to a storage unit and/or transportation unit 110 for either sequestration or subsequent industrial applications.

The CCUS 100 includes one or more CO2 sensors that can be used to measure a concentration level of CO2 at a given location within the CCUS 100. Exemplary CO2 sensors include a boiler sensor 112, a turbine sensor 114, a flue line sensor 116, one or more carbon capture sensors **118*a*, 118*b*, and a compressor sensor 120. The boiler sensor 112 monitors a concentration of CO in the boiler 102. The turbine sensor 114 can be used to monitor a concentration of CO2 in an exhaust gas of the turbine 104, which can affect turbine efficiency. The flue line sensor 116 measures a concentration of flue gas that is transported from the boiler 102 to the carbon capture device 106. A first carbon capture sensor 118*a* can be used to measure CO2 concentration in the CO2 distillate, while a second carbon capture sensor 118*b* can be used to measure CO2 remaining in the flue gas, thereby allowing control of various parameters of the carbon capture process, such as temperature, pressure, absorber concentration, etc. The compressor sensor 120** can be used to control the compression process.

Figure 2:
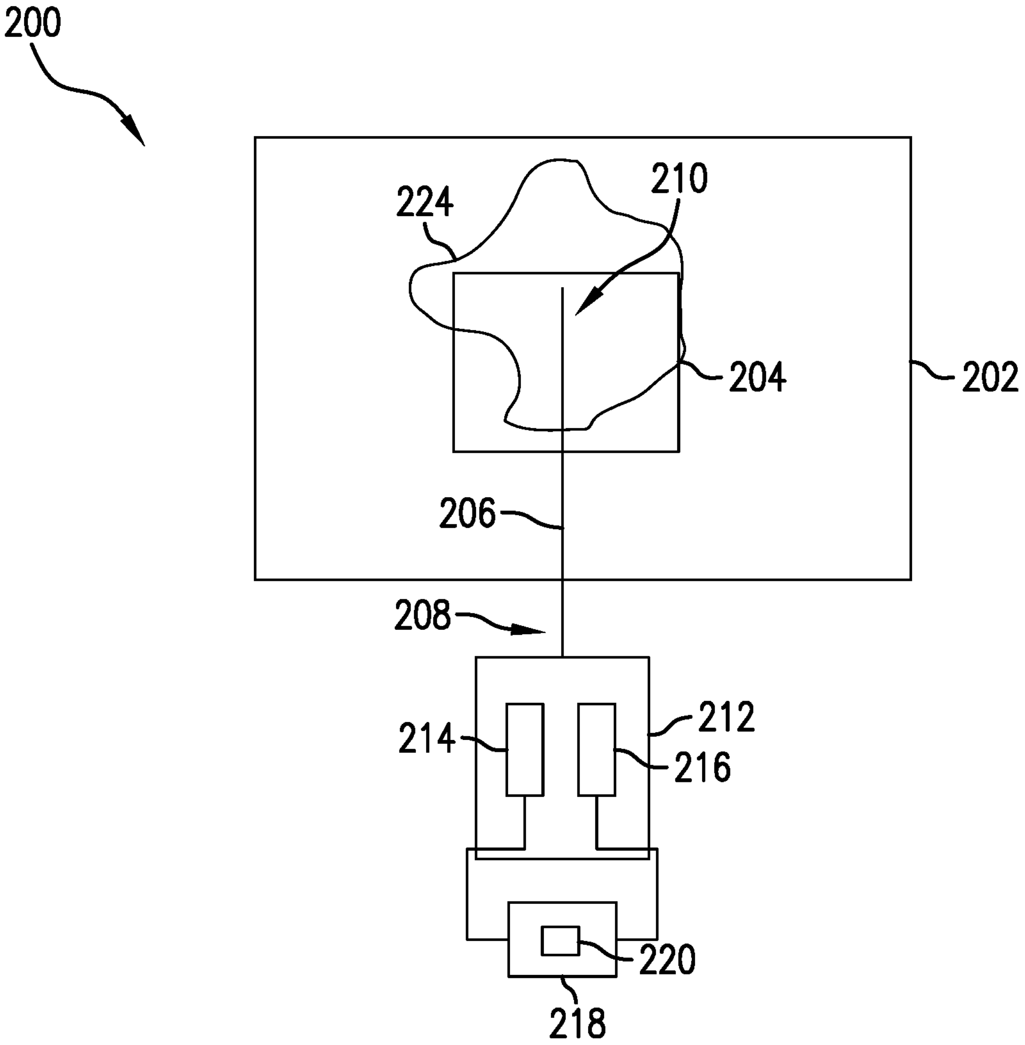
FIG. 2 shows a schematic diagram of a sensor suitable for use at the CCUS.

FIG. 2 shows a schematic diagram 200 of a sensor 202 suitable for use at the CCUS 100. The sensor 202 can be any of the sensors shown in FIG. 1 (i.e., boiler sensor 112, turbine sensor 114, flue line sensor 116, carbon capture sensors **118*a*, 118*b*, compressor sensor 120) or any suitable other CO2 sensor of the CCUS 100 that is not shown in FIG. 1. The sensor 202 includes a member 204 that supports an optical fiber 206. The optical fiber 206 includes a first end 208 and a second end 210. The first end 208 extends away from the member 204 and is coupled to an optical interrogator 212. The second end 210 extends along the member 204. In various embodiments, the second end 210 be affixed to a surface of the member 204 or embedded within the member 204**.

The optical interrogator 212 includes a light source 214 (such as a laser) for propagating a beam of light along an axis of the optical fiber 206 and a detector 216 for detecting a reflection of the light beam from the optical fiber 206. As discussed with respect to FIG. 3, a wavelength of the reflected light is indicative of a strain on the optical fiber 206. A control unit 218 includes a processor 220 for controlling operation of the optical interrogator 212 to obtain information about the strain on the optical fiber 206. The control unit 218 can control operation of the light source 214 by, for example, activating the light source 214 to transmit the light beam through the optical fiber 206. The control unit 218 can also monitor the wavelength of the transmitted light from the light source 214. The control unit 218 also receives a signal from the detector 216 indicating the wavelength of the reflected light. The processor 220 determines the strain at the second end 210 of the optical fiber 206 using the wavelength of the transmitted light and the wavelength of the reflected light. The control unit 218 can also control various operating parameters of the CCUS 100, such as the operating pressures, operating temperatures, chemical concentrations, etc. in order to improve a performance or efficiency of the CCUS 100.

Figure 3:
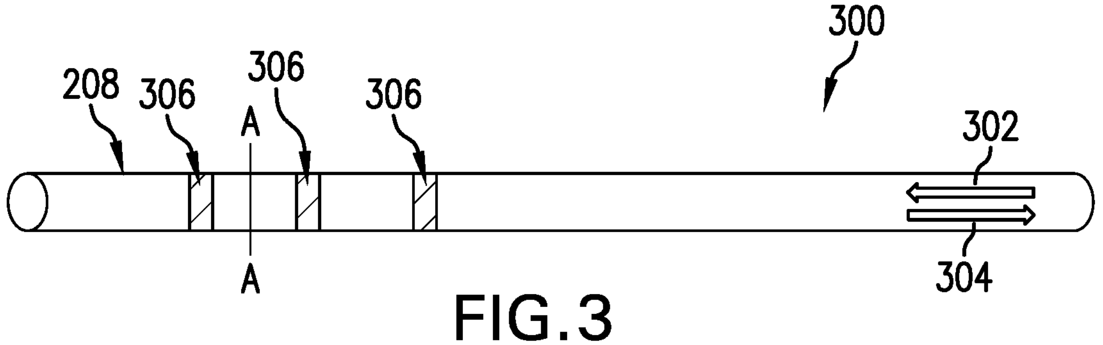
FIG. 3 shows a side view of the second end of the optical fiber, in an embodiment.

FIG. 3 shows a side view 300 of the second end 210 of the optical fiber 206, in an embodiment. Transmitted light 302 is shown entering the second end 210 from the optical interrogator 212 and reflected light 304 is shown exiting the second end 210 in the direction of the optical interrogator 212. The optical fiber 206 has a refractive index n along its axial length. The second end 210 includes a plurality of Bragg gratings 306 formed therein. A Bragg grating 306 is a segment of the optical fiber 206 in which the refractive index is altered to form a structure having periodically spaced regions. These regions are defined by a refractive index along the axis of the optical fiber 206 that is different from (often greater than) the refractive index of the optical fiber.

Figure 4:
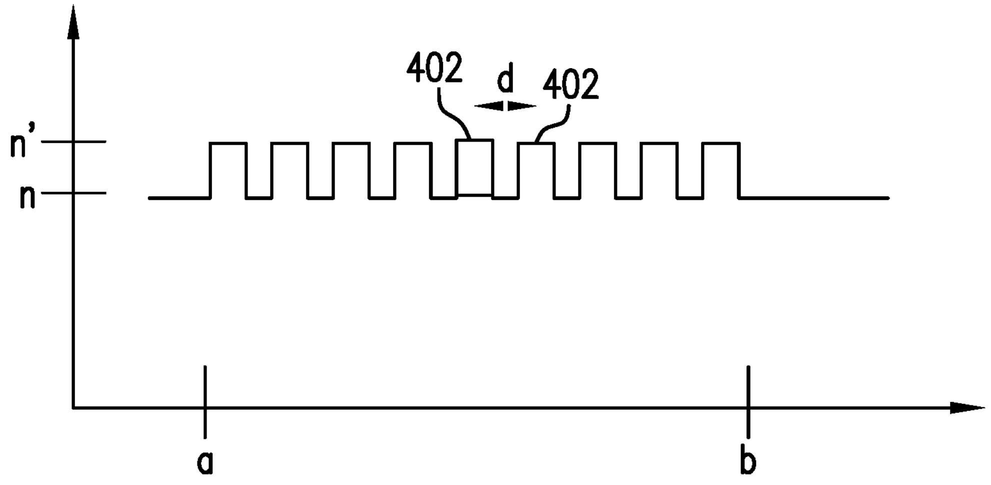
FIG. 4 shows a graph of a profile of the periodically spaced regions of a Bragg grating.

FIG. 4 shows a graph 400 of a profile of the periodically spaced regions of a Bragg grating. Regions 402 have an elevated index of refraction (n') and are periodically spaced from each other by a periodicity d. As a result of this periodic spacing, light is reflected from the Bragg grating 306 at a selected wavelength, known as the Bragg wavelength $\lambda_B$. The Bragg wavelength is related to the refractive index n of the optical fiber and the periodicity d of the regions of varied refractive index reflection as shown in Eq. (1):

$$\lambda_B = 2nd \qquad \text{Eq. (1)}$$

As the optical fiber 206 is stretched or compressed, the periodicity d increases or decreases, respectively, thereby changing the wavelength of the reflected light (i.e., the Bragg wavelength $\lambda_B$). Thus, by monitoring the Bragg wavelength $\lambda_B$, an operator can determine a magnitude of a stress along the axis of the optical fiber 206.

Figure 5:
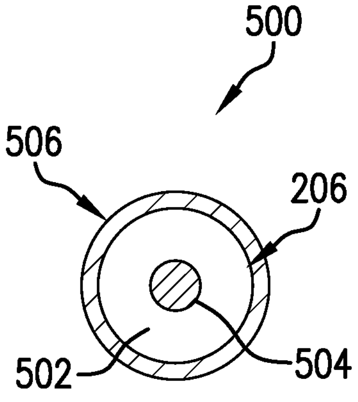
FIG. 5 shows a cross-sectional view of the optical fiber at cut A-A shown in FIG. 3.

FIG. 5 shows a cross-sectional view 500 of the optical fiber 206 at cut A-A shown in FIG. 3. The optical fiber 206 includes a cladding region 502 surrounding a core region 504. An index of refraction of the core region 504 ($n_{core}$) is higher that the index of refraction of the cladding region 502 ($n_{clad}$) surrounding the core. The Bragg grating 306 is written in the core region 504. The optical fiber 206 is a single mode fiber, which is defined by the relationship of Eq. (2):

$$V = \frac{2\pi r NA}{\lambda} < 2.405 \qquad \text{Eq. (2)}$$

where r is the radius of the core region 504, $\lambda$ is the wavelength of light and NA is the numerical aperture, given as shown in Eq. (3):

$$NA = \sqrt{n_{core}^2 - n_{clad}^2} \qquad \text{Eq. (3)}$$

The optical fiber 206 has a coating 506 on its outer surface. The coating 506 includes a chemical that interacts with carbon dioxide. The chemical reaction between the coating 506 and the carbon dioxide produces a strain along the axis of the optical fiber 206, thereby changing the periodicity d of the Bragg grating. In various embodiments, the coating 506 includes a chemical that is reactive with carbon dioxide to produce the strain on the optical fiber 206. In an exemplary embodiment, the coating 506 includes an amine-based compound. The reaction thus changes a periodicity d that can be detected by observing the change in the resulting Bragg wavelength. Thus, one can determine the presence of carbon dioxide by monitoring the Bragg wavelength. Additionally, the concentration of carbon dioxide is directly related to the strain on the optical fiber 206. Thus, the concentration of carbon dioxide can be determined from the Bragg wavelength.

In an embodiment, the sensor 202 is one of the carbon capture sensors 118*a*, 118*b* of FIG. 1. A gas mixture 224 (e.g., the flue gas) is detected at the sensor 202. The processor 220 determine the strain on the optical fiber 206 due to the CO2 in the gas mixture 224 and thereby determines a concentration of the CO2. The concentration of CO2 can be used to determine an efficiency of the carbon capture device 106. The processor 220 can then send a signal to adjust an operating parameter of the carbon capture device, such as an operating temperature, operating pressure, CO2 absorber concentration, etc., to improve a performance or efficient of the carbon capture process.

Set forth below are some embodiments of the foregoing disclosure:

Embodiment 1: A method of carbon capture. An optical fiber is disposed in a volume of a carbon capture utilization and storage system, the optical fiber including a coating that is sensitive to carbon dioxide to generate a strain on the optical fiber. A presence of carbon dioxide in the volume is determined from the strain on the optical fiber. An operating parameter for the carbon capture utilization and storage system is adjusted based on the presence of the carbon dioxide in the volume.

Embodiment 2: The method of any previous embodiment, further including determining a concentration of the carbon dioxide from the strain on the optical fiber and adjusting the operating parameter based on the concentration.

Embodiment 3: The method of any previous embodiment, further including determining the concentration based on a magnitude of the strain on the optical fiber.

Embodiment 4: The method of any previous embodiment, wherein the coating includes an amine compound.

Embodiment 5: The method of any previous embodiment, wherein the optical fiber includes a Bragg grating therein, further including measuring a Bragg wavelength of the Bragg grating to determine a magnitude of the strain.

Embodiment 6: The method of any previous embodiment, wherein the volume is in at least one of: (i) a boiler; (ii) a turbine; (iii) a pipeline; (iv) a carbon capture device; and (ii) a compressor.

Embodiment 7: The method of any previous embodiment, wherein adjusting the operating parameter further including at least one of; (i) adjusting an operating temperature; (ii) adjusting an operating pressure; and (iii) adjusting a concentration of a CO2 absorber.

Embodiment 8: A system for carbon capture includes a volume having a gas mixture therein, the gas mixture including carbon dioxide as a component, an optical fiber having a coating sensitive to carbon dioxide to generate a strain on the optical fiber, and a processor configured to adjust an operating parameter of the system based on a presence of the carbon dioxide determined using the optical fiber.

Embodiment 9: The system of any previous embodiment, wherein the processor is further configured determine a concentration of the carbon dioxide from the strain on the optical fiber and adjust the operating parameter based on the concentration.

Embodiment 10: The system of any previous embodiment, wherein the processor is further configured to determining the concentration based on a magnitude of the strain on the optical fiber.

Embodiment 11: The system of any previous embodiment, wherein the coating includes an amine compound.

Embodiment 12: The system of any previous embodiment, wherein the optical fiber includes a Bragg grating therein and the processor is further configured to measure a Bragg wavelength of the Bragg grating to determine a magnitude of the strain.

Embodiment 13: The system of any previous embodiment, wherein the volume is in at least one of: (i) a boiler; (ii) a turbine; (iii) a pipeline; (iv) a carbon capture device; and (ii) a compressor.

Embodiment 14: The system of any previous embodiment, wherein the optical fiber is one of: (i) disposed along a surface of a member of a sensor; and (iii) embedded within the member.

Embodiment 15: The system of any previous embodiment, wherein the operating parameter further includes at least one of; (i) an operating temperature; (ii) an operating pressure; and (iii) a concentration of a CO2 absorber.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of carbon capture, comprising:

disposing an optical fiber in a volume of a carbon capture utilization and storage system, the optical fiber including a Bragg grating therein and a coating that is sensitive to carbon dioxide to generate a strain on the optical fiber;

measuring a Bragg wavelength of the Bragg grating to determine a magnitude of the strain on the optical fiber due to the interaction of the coating with carbon dioxide;

determining a presence of carbon dioxide in the volume from the strain on the optical fiber; and adjusting an operating parameter for the carbon capture utilization and storage system based on the presence of the carbon dioxide in the volume.

2. The method of claim 1, further comprising determining a concentration of the carbon dioxide from the strain on the optical fiber and adjusting the operating parameter based on the concentration.

3. The method of claim 2, further comprising determining the concentration based on a magnitude of the strain on the optical fiber.

4. The method of claim 1, wherein the coating includes an amine compound.

5. The method of claim 1, wherein the volume is in at least one of: (i) a boiler; (ii) a turbine; (iii) a pipeline; (iv) a carbon capture device; and (v) a compressor.

6. The method of claim 1, wherein adjusting the operating parameter further comprising at least one of; (i) adjusting an operating temperature; (ii) adjusting an operating pressure; and (iii) adjusting a concentration of a CO2 absorber.

7. A system for carbon capture, comprising:

a volume having a gas mixture therein, the gas mixture including carbon dioxide as a component;

an optical fiber having a coating sensitive to carbon dioxide to generate a strain on the optical fiber;

a Bragg grating within the optical fiber; and a processor configured to measure a Bragg wavelength of the Bragg grating determine a magnitude of the strain based on the Bragg wavelength, determine a presence of carbon dioxide in the volume from the strain and adjust an operating parameter of the system based on a presence of the carbon dioxide in the volume.

8. The system of claim 7, wherein the processor is further configured determine a concentration of the carbon dioxide from the strain on the optical fiber and adjust the operating parameter based on the concentration.

9. The system of claim 8, wherein the processor is further configured to determining the concentration based on a magnitude of the strain on the optical fiber.

10. The system of claim 7, wherein the coating includes an amine compound.

11. The system of claim 7, wherein the volume is in at least one of: (i) a boiler; (ii) a turbine; (iii) a pipeline; (iv) a carbon capture device; and (v) a compressor.

12. The system of claim 7, wherein the optical fiber is one of: (i) disposed along a surface of a member of a sensor; and (ii) embedded within the member.

13. The system of claim 7, wherein the operating parameter further comprises at least one of; (i) an operating temperature; (ii) an operating pressure; and (iii) a concentration of a CO2 absorber.

* * * * *